United States Patent
Mody et al.

(10) Patent No.: US 10,555,597 B2
(45) Date of Patent: Feb. 11, 2020

(54) PHONE RING HOLDER

(71) Applicant: CASE-MATE, INC., Atlanta, GA (US)

(72) Inventors: Saumil Chetan Mody, Atlanta, GA (US); Nitin Koshy Philip, Sandy Springs, GA (US); William Thomas Warmoth, III, Atlanta, GA (US)

(73) Assignee: CASE-MATE, INC., Atlanta, GA (US)

( * ) Notice: Subject to any disclaimer, the term of this patent is extended or adjusted under 35 U.S.C. 154(b) by 0 days.

(21) Appl. No.: 15/891,483

(22) Filed: Feb. 8, 2018

(65) Prior Publication Data

US 2018/0220782 A1 Aug. 9, 2018

Related U.S. Application Data

(60) Provisional application No. 62/456,450, filed on Feb. 8, 2017.

(51) Int. Cl.
*A45F 5/00* (2006.01)
*A44C 9/00* (2006.01)
*H04B 1/3888* (2015.01)
*H04B 1/3827* (2015.01)

(52) U.S. Cl.
CPC ............. *A45F 5/00* (2013.01); *A44C 9/0061* (2013.01); *H04B 1/3888* (2013.01); *A45F 2200/0516* (2013.01); *H04B 2001/3861* (2013.01)

(58) Field of Classification Search
CPC .......... A45C 2007/0013; A45C 7/0077; A45C 7/0095; A45C 9/00; A45F 5/02; A45F 5/021; A45F 2003/001; A45F 2200/0575; A45F 5/00
USPC ........................................ 455/575.1
See application file for complete search history.

(56) References Cited

U.S. PATENT DOCUMENTS

| | | | |
|---|---|---|---|
| 9,179,565 B2 * | 11/2015 | Cho .................... | H05K 7/00 |
| 9,397,717 B2 * | 7/2016 | Curran .................. | H04B 1/385 |
| D765,662 S * | 9/2016 | Kang .................... | D14/251 |
| 2006/0258929 A1 * | 11/2006 | Goode, Jr. ............ | A61B 5/0031 |
| | | | 600/345 |

* cited by examiner

*Primary Examiner* — Ajibola A Akinyemi
(74) *Attorney, Agent, or Firm* — Gardner Groff & Greenwald, PC

(57) ABSTRACT

A holder accessory for a portable electronic device including a base portion configured for attachment to the portable electronic device, and a gripping component coupled to the base portion. The gripping portion can define an opening configured to receive a finger of a user to hold the electronic device. The gripping portion is movably coupled to the base portion. The gripping portion is pivotally and/or rotationally movable relative to the base.

10 Claims, 15 Drawing Sheets

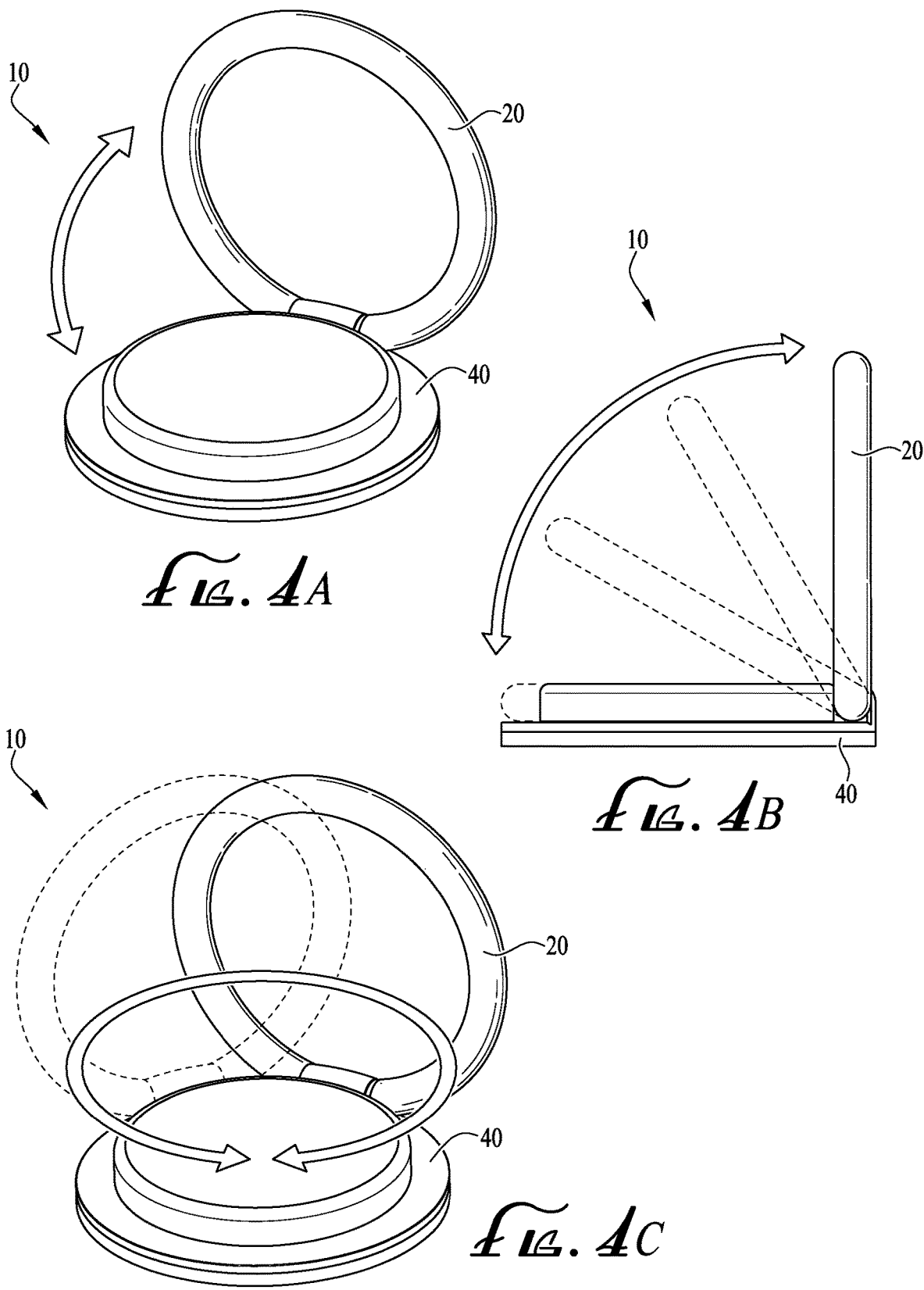

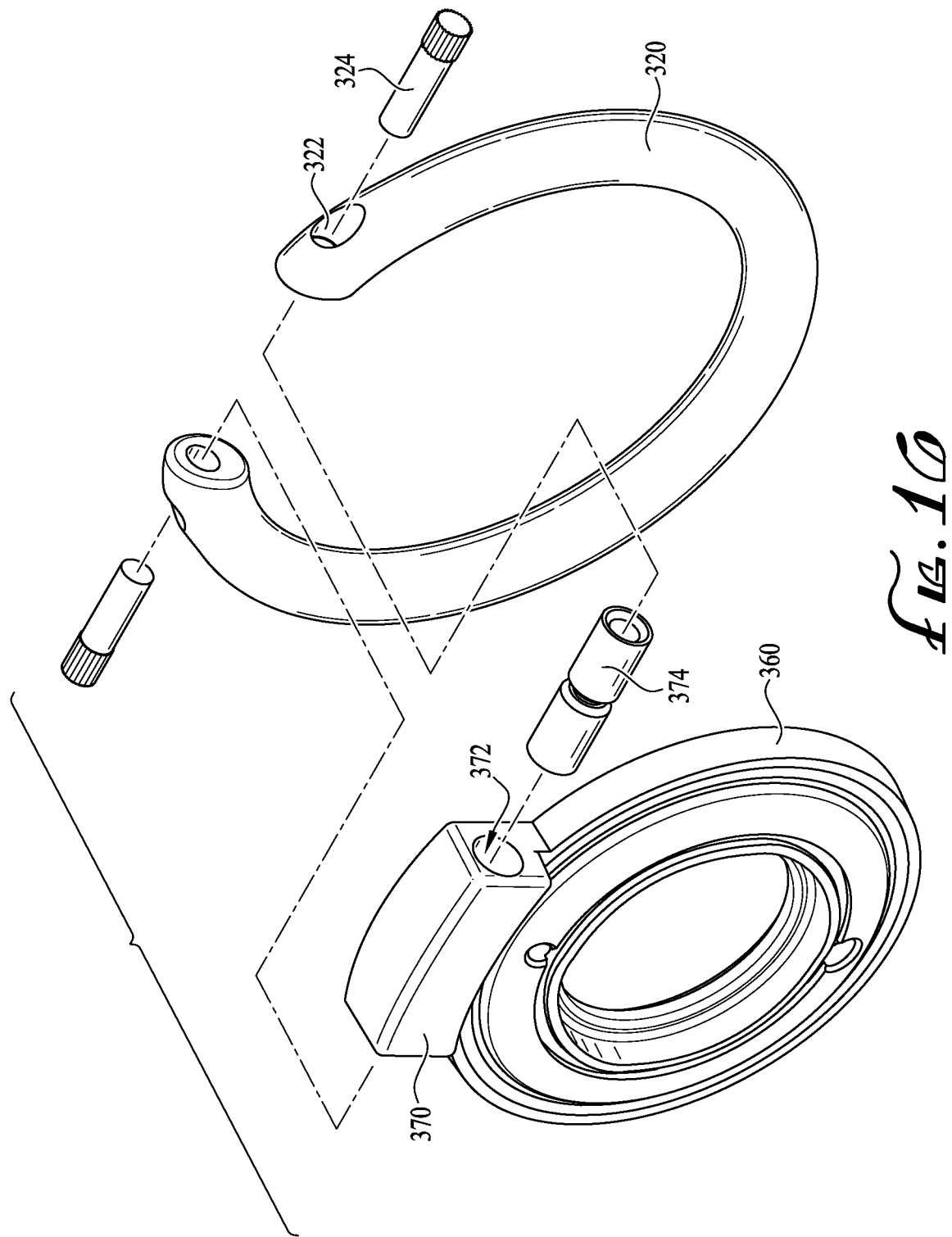

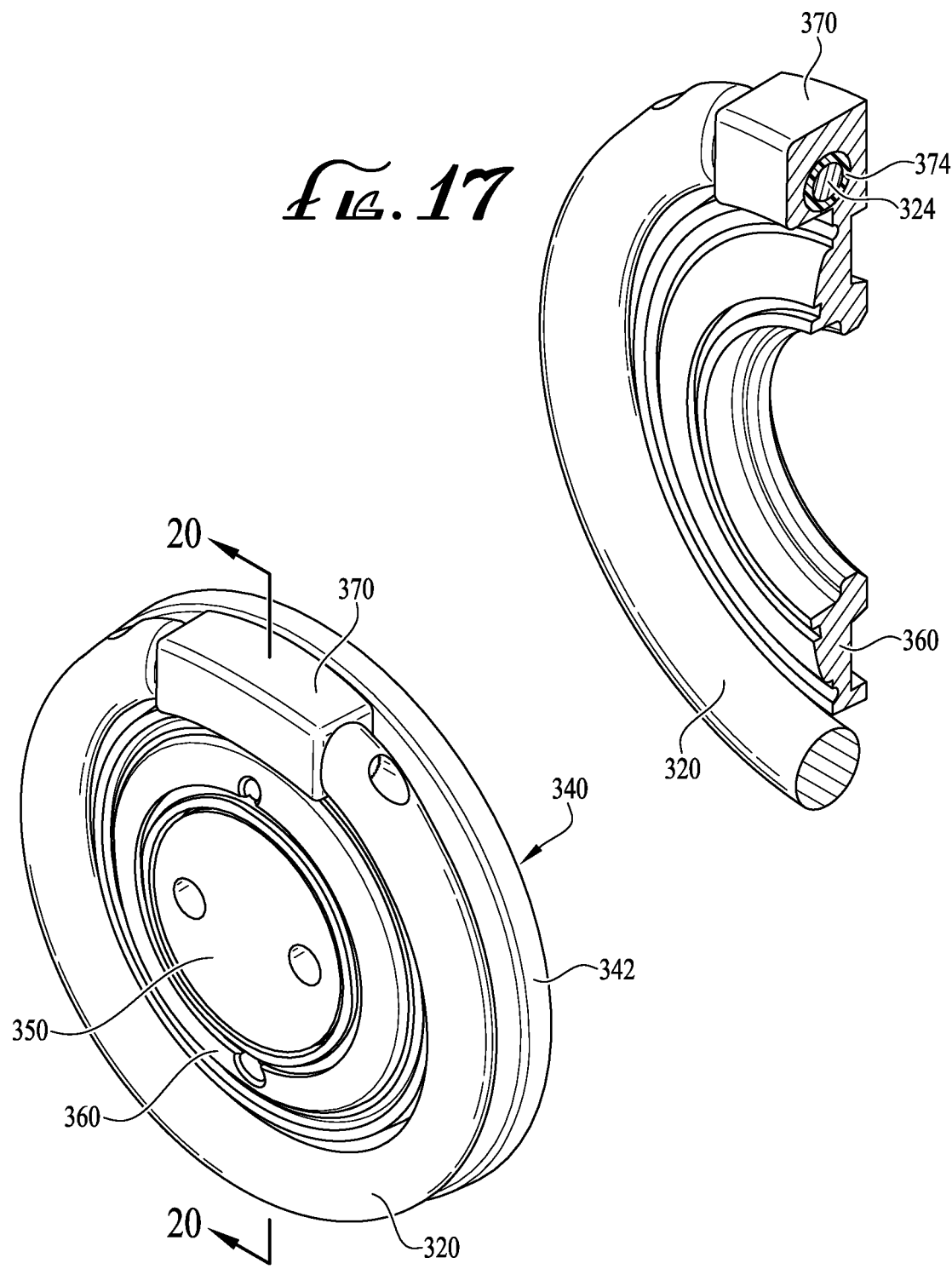

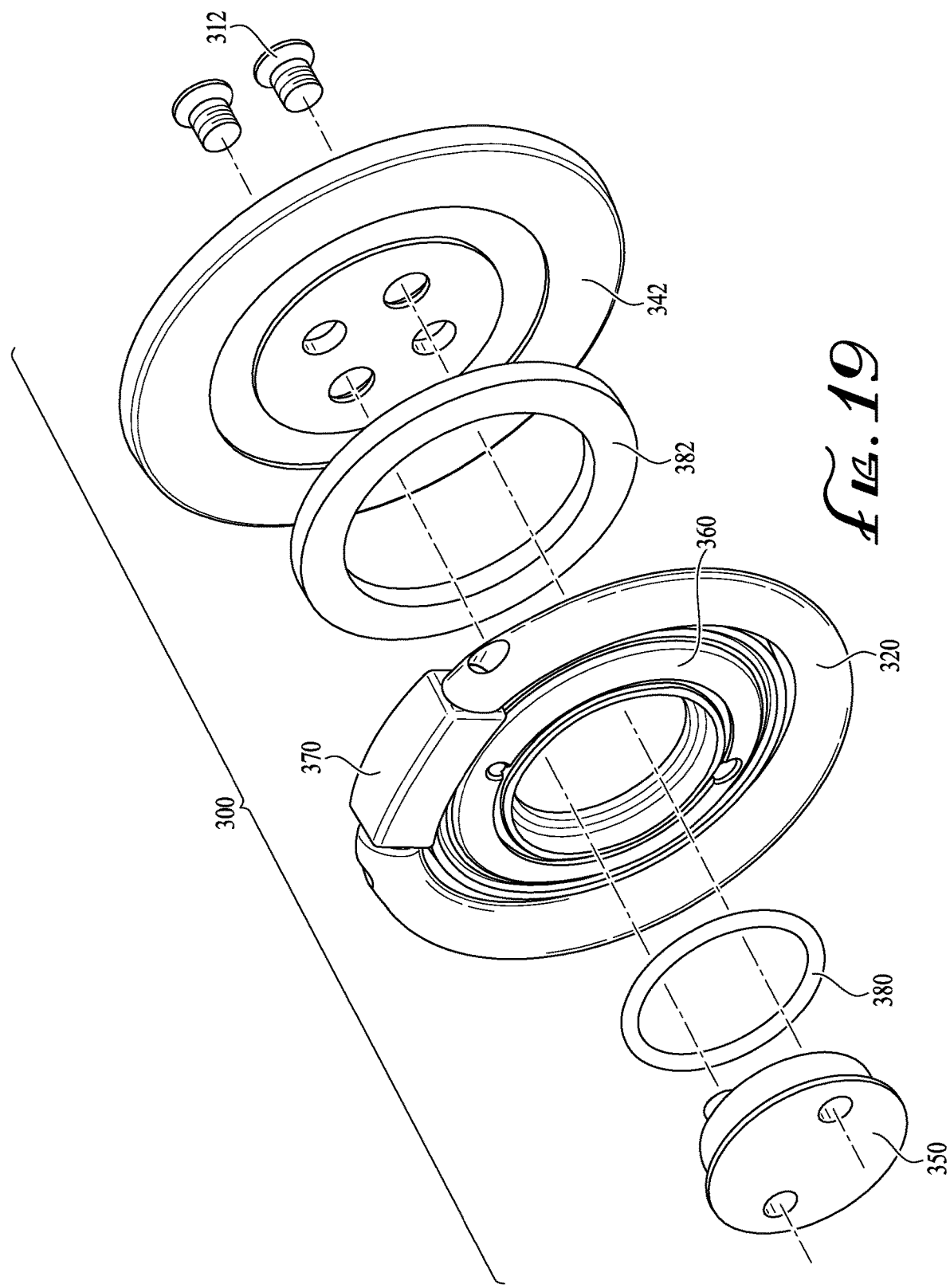

PHONE RING HOLDER

CROSS-REFERENCE TO RELATED APPLICATION

This application claims the benefit of U.S. Provisional Patent Application Ser. No. 62/456,450 filed Feb. 8, 2017, the entirety of which is hereby incorporated herein by reference for all purposes.

TECHNICAL FIELD

The present invention relates generally to the field of accessories for mobile electronic devices, and more particularly to a holder or finger grip device for attachment to a mobile phone or other electronic device to allow a user to more easily hold the device.

BACKGROUND

Some mobile phones and other portable electronic devices can be difficult to hold and operate in some applications. This may be particularly problematic with larger devices and in single-handed modes of use, for example when taking a photograph such as user-directed photograph (a "selfie"). Damage caused by dropping a mobile electronic device can be very expensive. Thus, it can be seen that needs exist for improvements to portable electronic devices to assist a user in securely holding the device, even larger devices held in one hand by a user. There also exist a need to have a device in a vertical viewing orientation for hands free viewing.

It is to the provision of accessories and improvements for portable electronic devices meeting these and other needs that the present invention is primarily directed.

SUMMARY

In example embodiments, the present invention provides accessories and improvements for portable electronic devices to assist a user in securely holding a portable electronic device, even larger devices held in one hand by a user, or positioning the device in a vertical viewing orientation for hands-free viewing. In particular, the invention provides holder accessory for a portable electronic device including a base portion configured for attachment to the portable electronic device, and a gripping component coupled to the base portion. The gripping portion can define an opening configured to receive a finger of a user or a hook mount to hold the electronic device. The gripping portion can be used to position the device in a vertical viewing orientation for hands-free viewing. The gripping portion is movably coupled to the base portion. The gripping portion is pivotally and/or rotationally movable relative to the base.

In one aspect, the present invention relates to a holder accessory for a portable electronic device. The holder device comprises a base portion configured for attachment to the portable electronic device and a gripping component. The gripping component is movably mounted to the base portion. Preferably, the gripping portion is movable between a storage position and a use position.

In another aspect, the present invention relates to a holder accessory for a portable electronic device. The holder accessory preferably includes a base portion configured for attachment to the portable electronic device, and a ring portion coupled to the base portion. The ring portion preferably defines an opening configured to receive a finger of a user to hold the electronic device.

In still another aspect, the invention relates to a holder accessory for a portable electronic device. The holder device preferably includes a base portion with a base plate configured for attachment to the portable electronic device and a cap mounted to the base plate. The holder accessory also includes a rotating component mounted between the base plate and the cap wherein the rotating component can rotate with respect to the base portion. The holder accessory also includes a gripping ring pivotally mounted to the rotating component wherein the gripping ring can rotate between a storage position and a use position.

In still another aspect, the invention relates to a method of modifying a portable electronic device to assist a user in holding the portable electronic device. The method preferably includes attaching a holder accessory to the portable electronic device, the holder accessory having a base portion configured for attachment to the portable electronic device, and a ring portion coupled to the base portion, and the ring portion defining an opening configured to receive a finger of a user to hold the electronic device.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 4A is a perspective view of the holder accessory of FIG. 3 showing the range pivotal of motion of the gripping component.

FIG. 4B is a side view of the holder accessory of FIG. 3 showing the range of pivotal motion of the gripping component.

FIG. 4C is a perspective view of the holder accessory of FIG. 3 showing the range of rotational motion of the gripping component.

FIG. 16 is an exploded perspective view of the gripping component and rotational component of FIG. 15.

FIG. 17 is a cross-sectional perspective view of the gripping component and rotational component of FIG. 15.

FIG. 18 is a perspective view of the base, rotational component, and gripping component of FIG. 13.

FIG. 19 is an exploded perspective view of the base, rotational component, and gripping component of FIG. 18.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
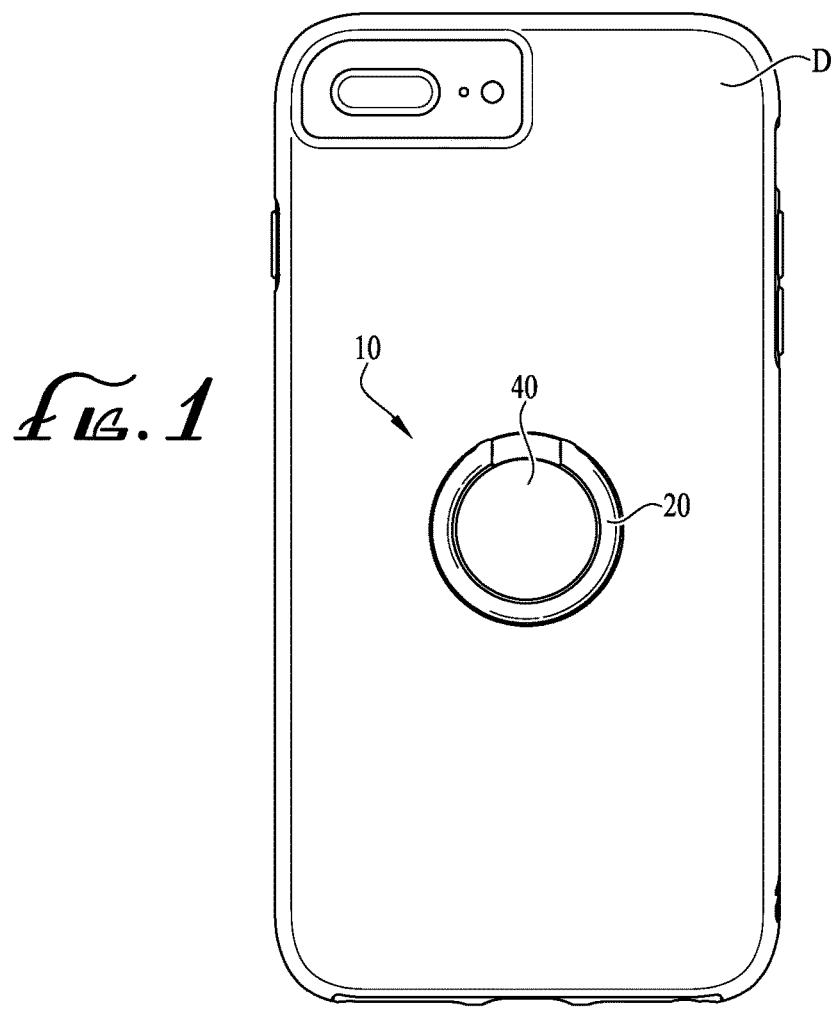
FIG. 1 is a back view of a portable electronic device having a holder accessory mounted thereon according to an example embodiment of the present invention.
Figure 2:
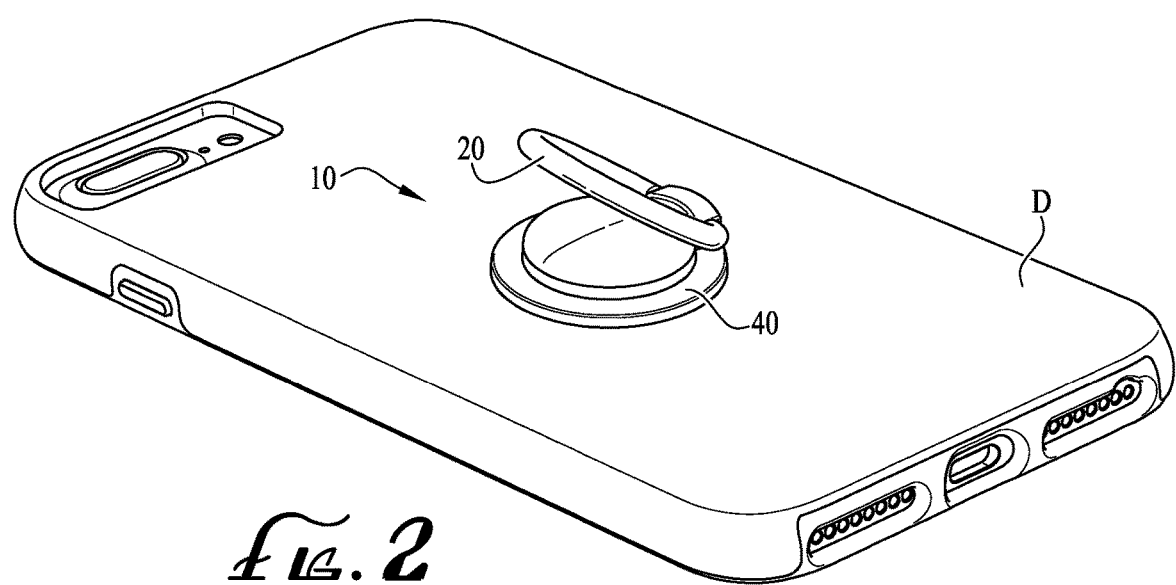
FIG. 2 is a perspective view of the portable electronic device and holder accessory of FIG. 1, with the holder accessory in a use position.
Figure 3:
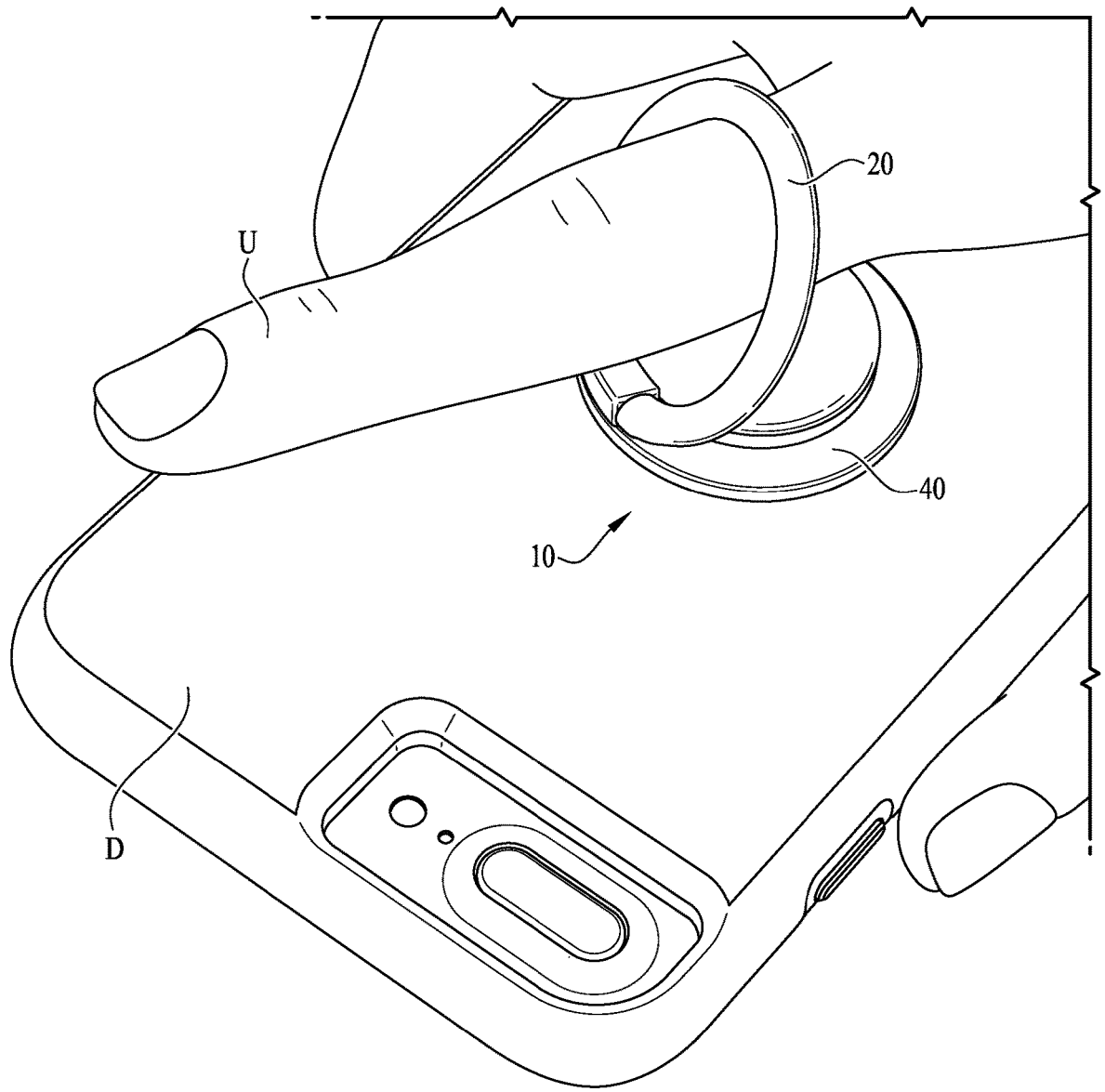
FIG. 3 shows an example mode of use of the electronic device and holder accessory of FIG. 2.

With reference now to the drawing figures, wherein like reference numbers represent corresponding parts throughout the several views, FIGS. 1-9 show a holder accessory 10 for a portable electronic device D. The holder accessory 10 is generally a device comprising a gripping component or gripping portion 20 attached to a base or base portion 40. In example embodiments, the holder device accessory 10 is mounted to a back panel of a portable electronic device D like a mobile phone. In other embodiments, the holder device accessory 10 is mounted to a back panel of a case installed on the device D, as shown in FIGS. 1-3. The holder device 10 can be used with portable electronic devices other than a mobile phone, such a tablet computers or e-readers. The gripping component 20 is generally movably mounted to the base 20 of the holder device 10 so the gripping component is moveable between a storage position, shown in FIG. 1, and a use position, shown in FIG. 2. In an example mode of use, a user U can use the holder accessory 10 to hold the device D by engaging the gripping component 20 with one or more fingers, as shown in FIG. 3. In example embodiments, the gripping component 20 is has a hole or opening. In the depicted embodiment, the gripping component 20 is ring-shaped. The user U can engage the gripping component 20 by inserting one or more fingers through the ring to securely hold the mobile device D. In other embodiments, the gripping component can have another shape such as a tab or post. The gripping component or ring 20 can also include decorative elements. For example, the ring 20 can appear to be a string of beads or can have the appearance of other ring-like jewelry.

As stated above, the gripping component 20 can be movably mounted to the base 40 of the holder accessory 10. FIGS. 4-5 show the range of motion of a gripping portion 20 of a holder accessory 10 according to an example embodiment of the invention. As shown in FIGS. 4A and 4B, the holder device gripping component or ring 20 is hingedly or pivotally attached to the base portion 40, as indicated by the arrows. In example embodiments, the ring 20 is pivotal between a closed or storage position, where the ring is positioned around or above the base 40, and an open or use position where the ring is pivoted away from the base. The ring 20 can pivot between 0°, where the ring is aligned with or above the base 40, and a fully open position, where the ring is rotated up to 180° away from the storage position. In other embodiments, the fully open position of the ring 20 is positioned at 90° away from the storage position or perpendicular to the base portion. In other embodiments, the ring 20 can have a plurality of open positions between 0° and 180°. In example embodiments, the gripping component 20 is also rotationally movable relative to the base 40. Preferably, the ring 20 is has a 360° range of twisting motion, as indicated by the arrow in FIG. 4C. In other embodiments, the range of twisting motion is less than 360°. The user U can use the rotational movement of the gripping ring 20 to reposition the holder 10 as desired relative to the device D. For example, the user U will adjust the position of the gripping ring 20 when the device D is held in landscape mode versus if the device is held in portrait mode.

Figure 5A:
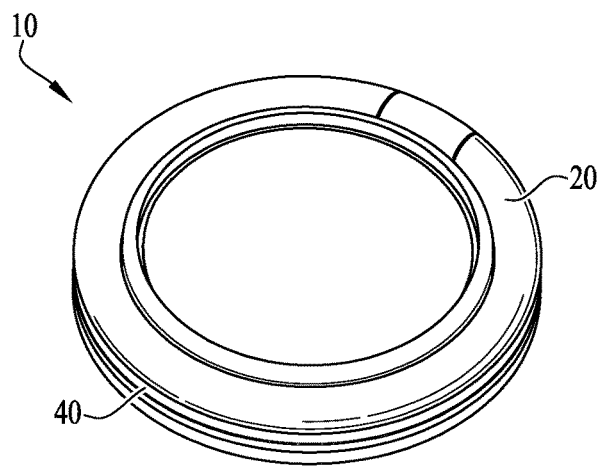
FIGS. 5A-5D show a sequence of pivotal and rotational movement of the gripping portion of the holder accessory of FIG. 3, moving from a closed or retracted position to a series of open or extended positions.
Figure 5B:
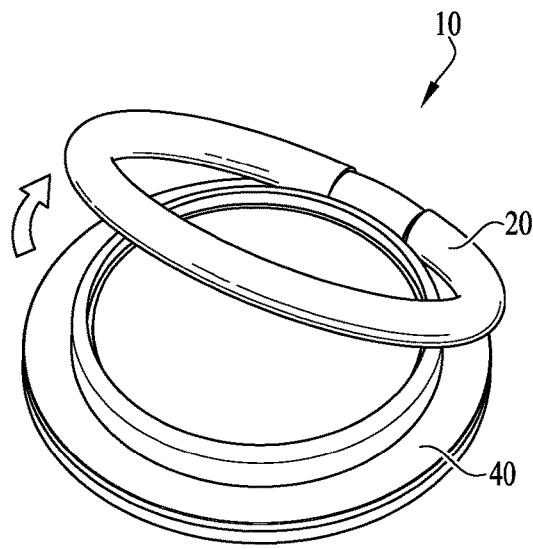
Figure 5C:
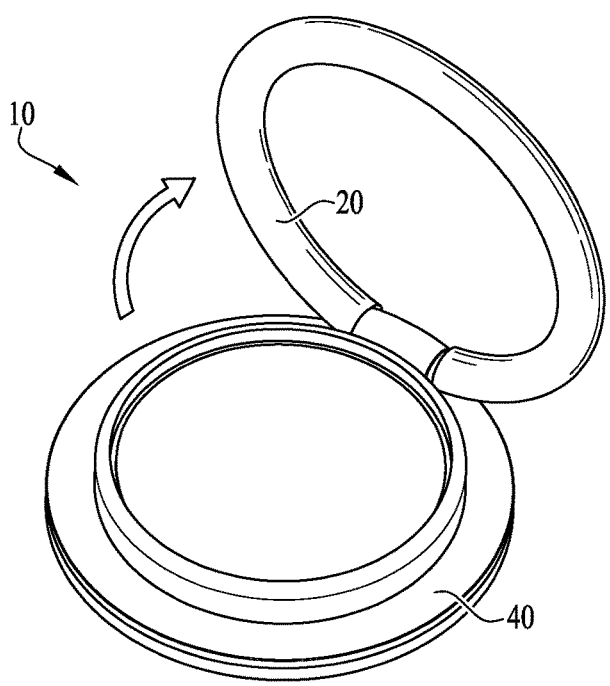
Figure 5D:
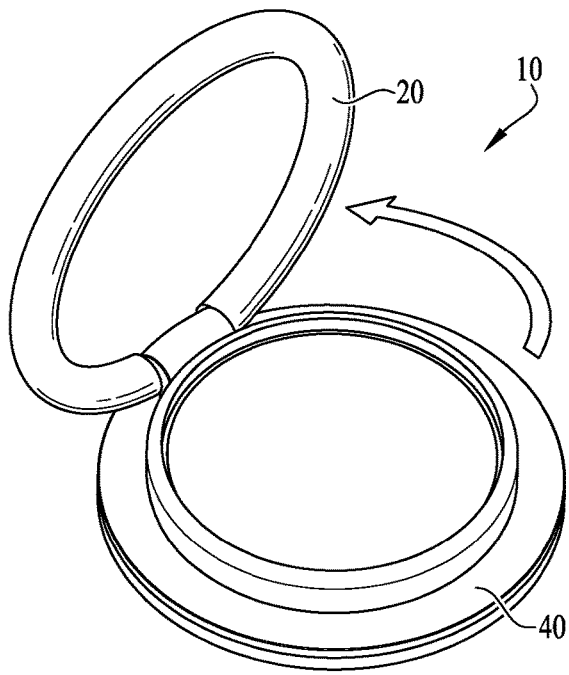

In use, the holder device 10 is adhesively or otherwise attached to a back panel of a mobile phone or other portable electronic device D, or to a back panel of a protective and/or ornamental case installed on the electronic device. In example embodiments, the holder accessory device 10 is permanently attached to the electronic device D or case using an adhesive or other permanent or semi-permanent fastening means. The base 40 can also be included in the mold of the mobile device D or device case such that the base and the device/case are a single, unitary component. In other embodiments, the holder accessory device 10 is removably attached to the device D or device case using removable attachment means such as magnet, snap fastener, or suction device. A removable attachment means would allow a user to remove the holder accessory 10 when not in use. When the base 40 is attached to the device D or device case, the gripping component 20 can stay in a storage position, shown in FIG. 5A, when not in use. To use the holder accessory, the gripping component 20 is pivoted away from the base portion 40, as shown in FIG. 5B, to the use position, shown in FIG. 5C. A user grips the holder device 10, for example by inserting one or more finger(s) through the opening of the ring portion 20, to hold the electronic device in a desired orientation. In this manner, a more secure grip is provided, reducing the likelihood of dropping and damaging the electronic device. The user may optionally reposition the ring portion 20 rotationally, shown in FIG. 5D, to any desired position.

In addition to being used as a holder device, the holder accessory 10 can have other uses. For example, the holder accessory 10 can be used as a stand for the portable electronic device D. The gripping component 20, in the use position, can support the device D at an angle against a support surface. In use as a stand, an edge of the device D and a portion of the gripping component 20 rest against a support surface supporting the rest of the device above the support surface. The gripping component 20 can be positioned and dimensioned to support the device D in a landscape orientation and/or a portrait orientation. In other uses, the gripping component 20 can be used to support the device D on a hook or stand. For example, a ring-shaped gripping component 20 can engage a post or hook on structure, like a support stand, to hold or hang the device D above a support surface. A user can position the gripping ring 20 for hands-free use of the device when using device functions like the camera, video recording, or flashlight functions. The holder accessory 10 can also be configured for engagement with a variety of accessories—either when the gripping component 20 is in the open or closed position. For example, the holder accessory 10 can be used to attach a device D to other accessories like selfie-sticks, docking stations, wireless chargers, and car mounts. When not in use as a gripping accessory, the ring portion 20 can be pivoted to back to the storage position, aligned along the back panel of the electronic device, as shown in FIG. 5A.

Figure 6:
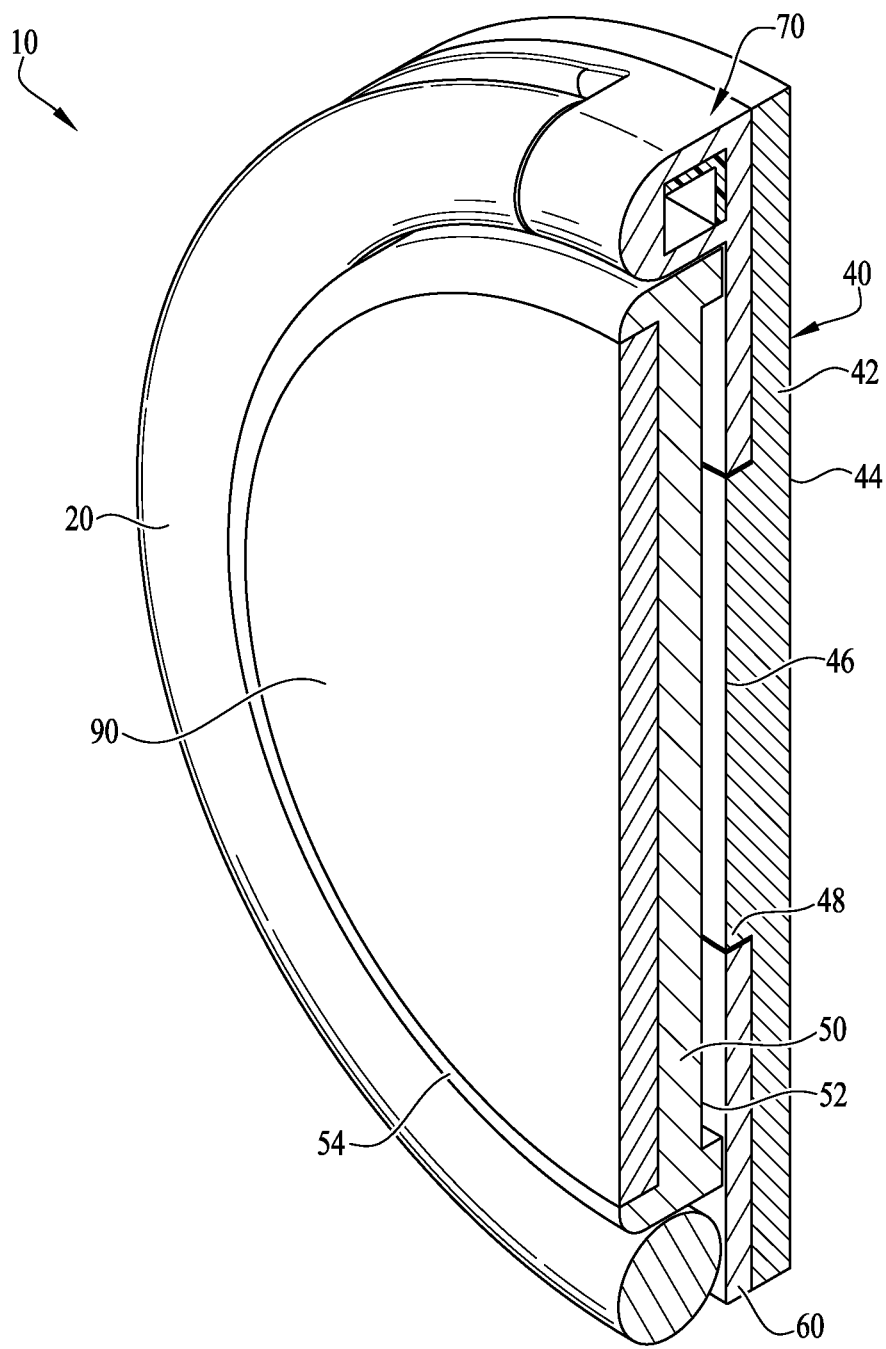
FIG. 6 is a cross-sectional perspective view of the holder accessory of FIG. 1.

FIG. 6 shows additional details of the holder device 10. The base portion 40 of the example embodiment generally includes a base plate or panel 42 and a cap 50. In example embodiments, the base plate 42 and cap 50 are formed from plated metal such as a non-conductive vacuum metal (NCVM) plated polycarbonate or a zinc alloy. In other embodiments, the components can be formed from other materials including metals, plastics, and organic materials such as wood. The base plate 42 generally includes a substantially flat rear face 44 configured for attachment to the device D or device case. In example embodiments, the rear face 44 of base plate 42 has an adhesive material applied thereon for permanent attachment to the device D. The base panel 42 can be attached to the device D or the device case by the manufacturer. In other embodiments, the holder accessory 10 can be sold directly to users allowing the user to attach the holder accessory to a pre-purchased device or case. Alternatively, the base panel 42 is molded directly onto the device D or device case.

In the example embodiment, the cap 50 is attached to the front face 46 of the base panel 42. In the depicted embodiment, the front face 46 of the base panel 42 includes a centrally positioned protrusion 48 extending outward from the front face. The protrusion 48 is configured to engage the rear face 52 of the cap 50 to define a circular channel between the cap and the base plate. The circular channel extends around the protrusion 48 of the base plate 42. The channel is configured to receive a rotational or rail portion 60. Generally, the rail 60 can rotate within the circular channel to allow for rotational repositioning of the attached gripping ring 20.

The rail 60 is formed from a disc with a central aperture dimensioned to fit around the protrusion 48 in the front face 46 of the base panel 42. The rail 60 can be formed from the same material as the base 40. In other embodiments, the rail 60 is formed from a different material. The rail 60 is configured to rotate generally freely around the protrusion 48 between the base panel 42 and the cap 50. The cap 50, rail 60, and base plate 42 are concentrically aligned. In the depicted embodiment, the base plate 42 and rail 60 have a similar diameter. In other embodiments, the base plate 42 and rail 60 are different sizes. The cap 50 has a smaller diameter than the rail 60 so that the outer peripheral edge of the rail extends beyond the outer peripheral edge of the cap.

The holder accessory 10 generally includes a hinge 70 that can be positioned along the outer peripheral edge of the rail 60. In the depicted embodiment, the hinge 70 extends upward from the front face of the rail 60, extending away from the device D. The gripping component or ring 20 is pivotally attached to the hinge 70 on the rail 60. In the depicted embodiment, the ring 20 is positioned around the cap 70 and above the rail 60 when in the storage position. The hinge 70 is positioned so that the hinge rotates around the cap 50 as the rail 60 rotates relative to the base 40. The gripping ring 20 is dimensioned to surround and be generally flush with the cap 50 when the ring is in the storage position, shown in FIG. 6. Rotating the rail 60 adjust the position of the hinge 70 relative to the base 40 allowing the user to adjust the orientation of the gripping ring 20 relative to the base and device D.

Figure 7:
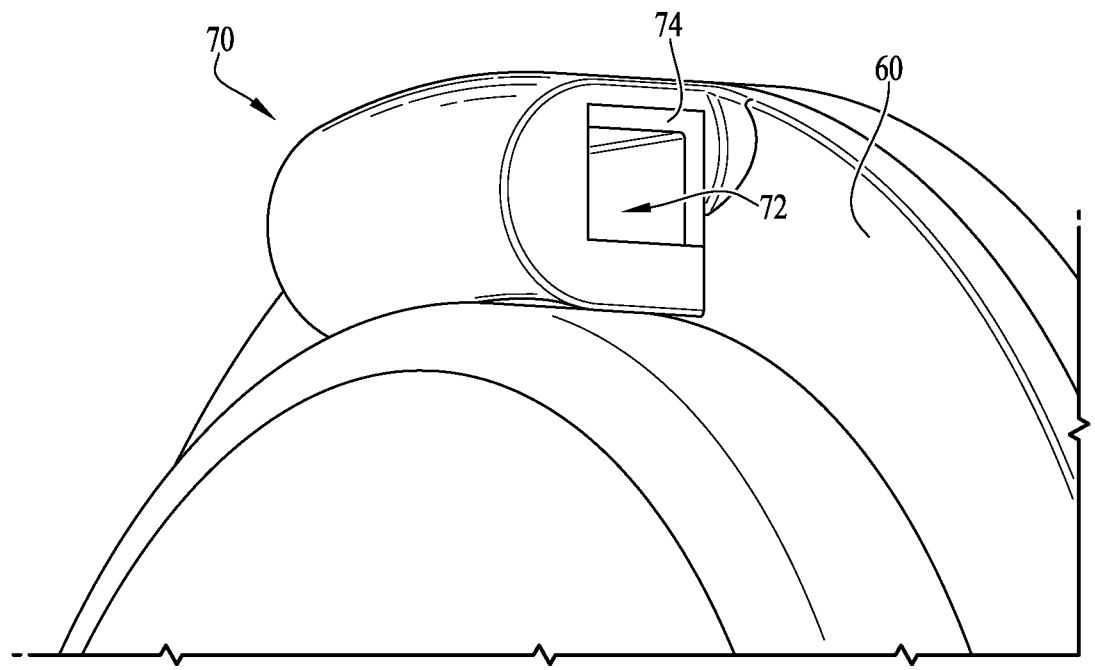
FIG. 7 is a detailed view of the snap-hinge mechanism of the holder accessory of FIG. 6.
Figure 8:
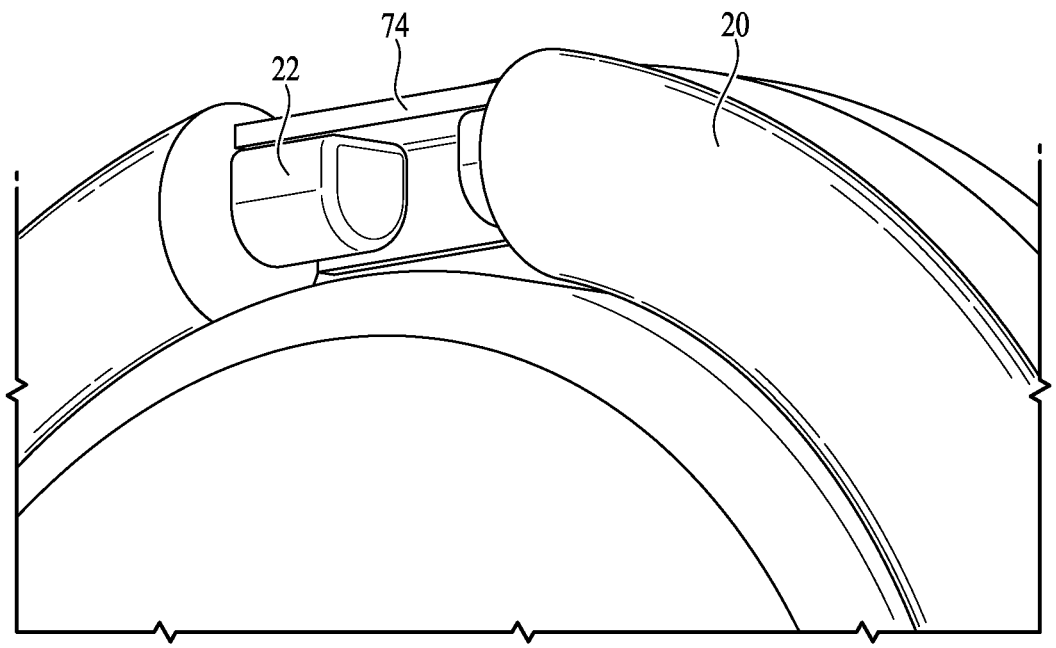
FIG. 8 is a cut-away detailed view of the snap-hinge mechanism of the holder accessory of FIG. 6.
Figure 9:
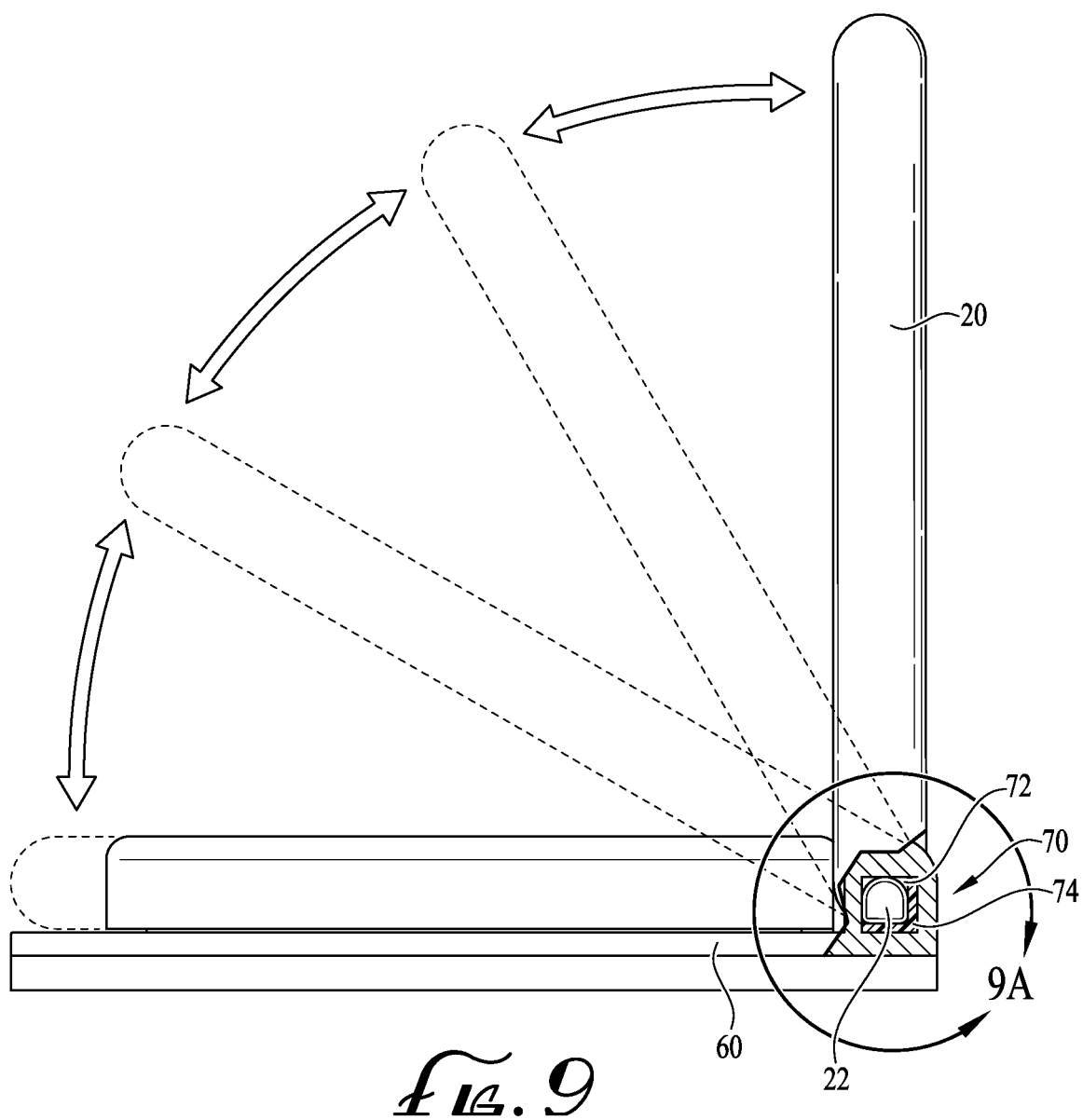
FIG. 9 is a side cut-away view of the holder accessory of FIG. 1.
Figure 9A:
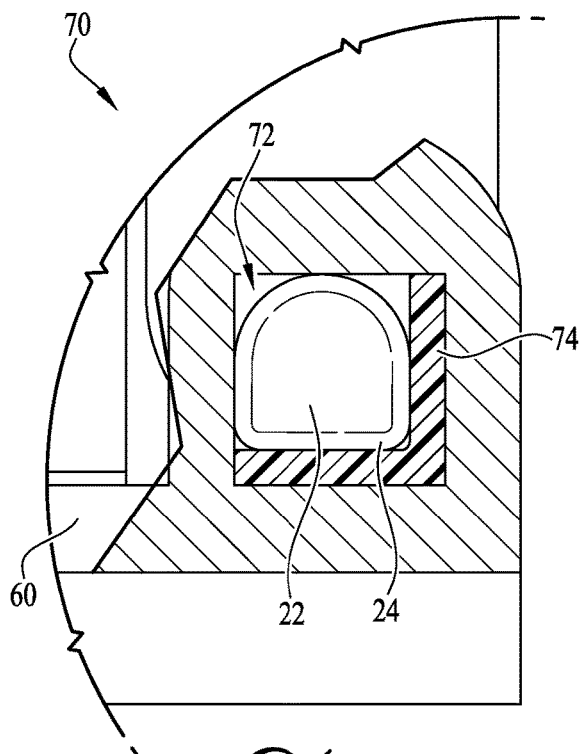
FIG. 9A is a detailed side cut-away view of the holder accessory of FIG. 9, with the gripping component in a use position.
Figure 9B:
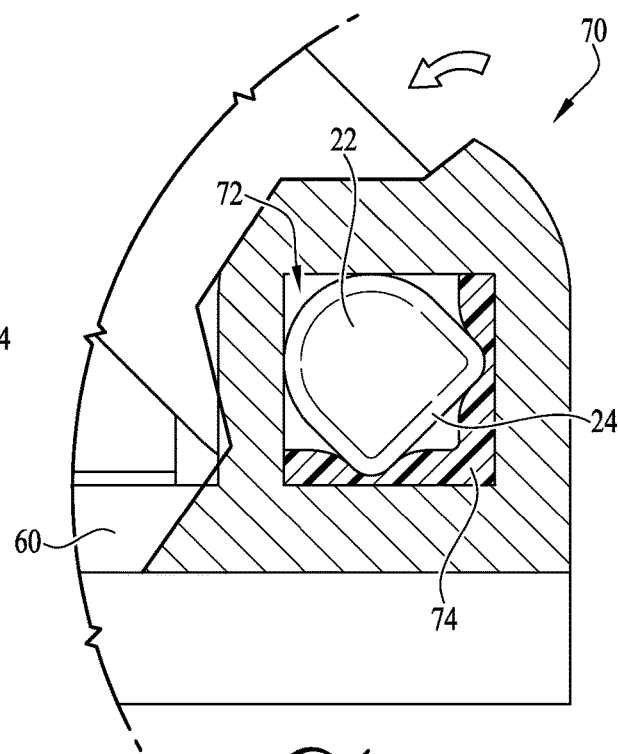
FIG. 9B is a detailed side cut-away view of the holder accessory of FIG. 9, with the gripping component being pivoted from the use position to the storage position.

FIGS. 7-9 show additional details of the hinge 70 and the pivotal connection between the ring 20 and the rail 60. The hinge mechanism 70 generally includes a channel 72 extending through the hinge. The channel 72 is configured to receive a portion of the gripping ring 20. In the depicted embodiment, the ends of the ring 20 each include a hinge pin 22 configured to fit within the channel 72. The hinge pins 22 are designed to rotate within the channel 72 as the gripping ring 20 is pivoted relative to the base 40. In example embodiments, the hinge mechanism 70 includes a tensioner component 74 designed to bias the gripping ring 20 in either the storage position or the use position. The tensioner component 74 is positioned within the rectangularly-shaped channel 72 of the hinge 70. The tensioner component 74 is formed of thermoplastic polyurethane (TPU) or another resilient or flexible material. The hinge pins 22 of the ring 20 having a partially rectangular and partially rounded or radiused profile which interact with the rectangular TPU tensioner element 74 positioned within the hinge channel or sleeve 72. The tensioner element 24 biases and holds the rectangular profile portion 24 of the hinge pin 22 flush against the tensioner element, as shown in FIG. 9A. The rectangular profile portion 24 is configured to correspond with the use and storage position of the ring 20. When adequate pivotal force is applied to the gripping ring 20, the corners of the rectangular profile portion 24 of the hinge pin 22 depress the tensioner element 74, as shown in FIG. 9B, to allow the gripping ring 20 to move between the storage and use position. The biasing feature of the tensioner element 74 will cause the gripping ring 20 to "snap" into either the storage or use position.

The tensioner element 74 can also act to limit the range of pivotal motion of the gripping ring 20. In the depicted embodiment, the tensioner element 74 is positioned along two adjacent sides of the hinge channel 72. The rectangular profile portion 24 of the hinge pin 22 can rotate between the sides of the channel 72 with the tensioner element 74. But the rectangular profile portion 24 is restricted from moving past the sides of the channel without the tensioner element 74 which are not constructed of a flexible or depressible material and so will not give way to the corners of the rectangular profile. Thus, the dome-shape hinge pin shown in FIGS. 9A and 9B limits the range of pivotal movement of the ring 20 to 90°.

Optionally, the holder accessory can include a decorative element or insert 90. In the depicted embodiment, the cap 50 of the base 40 includes the decorative insert 90. The decorative insert 90 is positioned on top of or above the cap 50 such that it is surrounded by the gripping ring 20 and can be seen by the user when the ring is in the storage position. In the depicted embodiment, the front face of the cap 50 includes a peripheral rim 54 around the outer peripheral edge of the front face. The insert 90 is dimensioned to fit within the peripheral rim 54 of the cap 50. In other embodiments, the cap 50 has a substantially flat front face and the decorative insert 90 is attached over the front face of the cap. In still other embodiments, the decorative insert 90 can be attached to another component of the holder accessory 10 including the rail 60.

Figure 10:
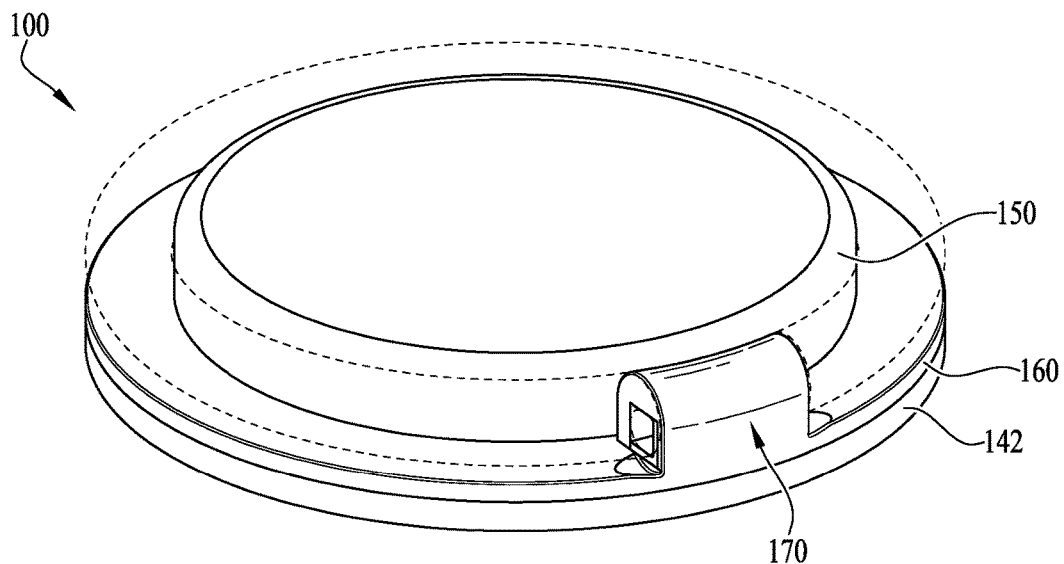
FIG. 10 is a perspective view of the base of a holder accessory for a portable electronic device according to another example embodiment of the present invention.
Figure 11:
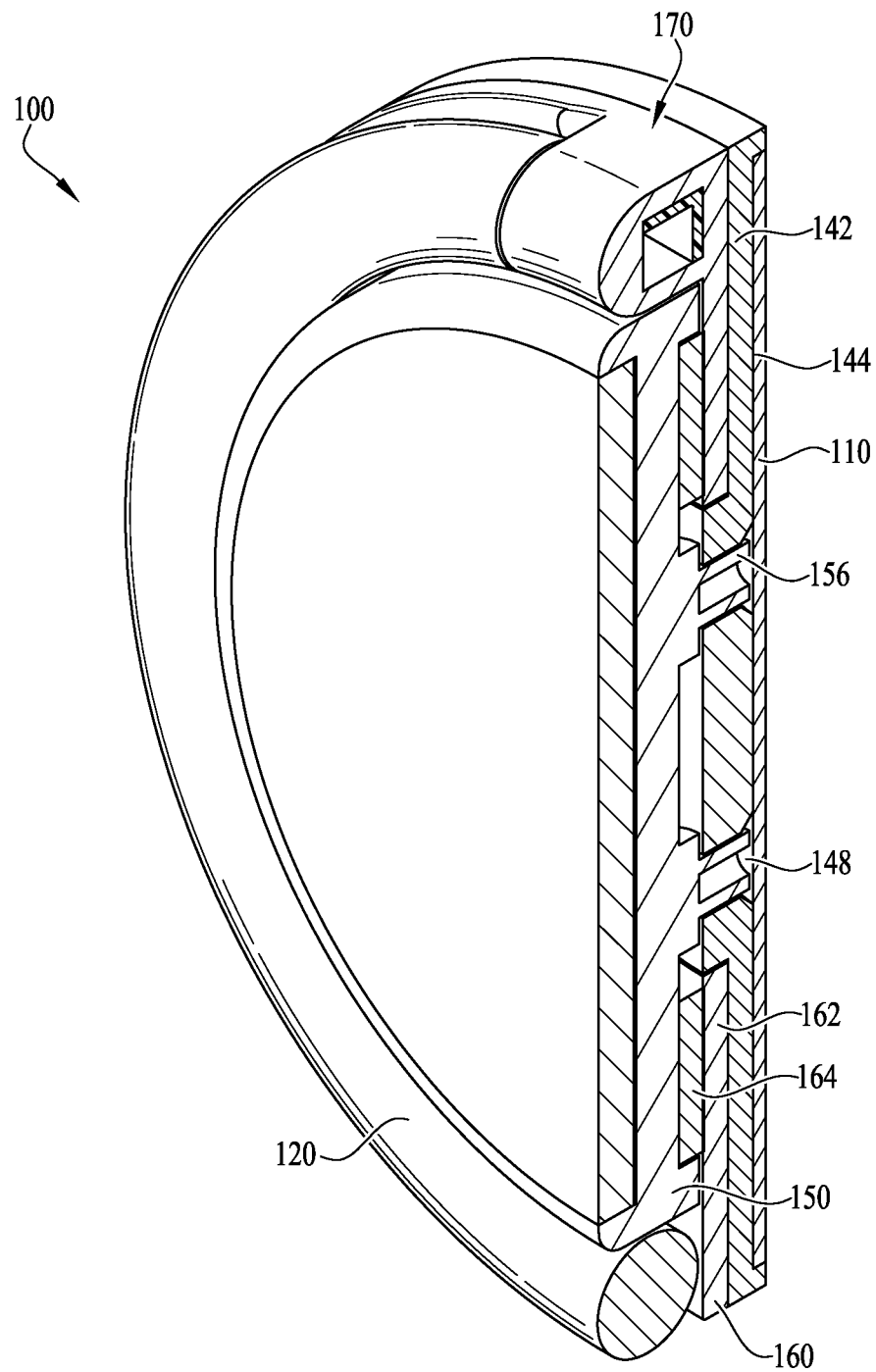
FIG. 11 is a cross-sectional perspective view of the holder accessory of FIG. 10.

FIGS. 10-11 show a holder accessory 100 for a portable electronic device according to another example embodiment of the invention. The holder accessory 100 includes a gripping component or ring 120 pivotally attached to a hinge 170 on a rotational rail 160, similar to the previous embodiment. In the depicted embodiment, the rear face 144 of the base plate 142 includes a recess configured to receive an adhesive or other fastening mechanism 110 for attaching the holder accessory to the portable device D or case. The base plate 142 also includes one or more slots or openings 148 configured to receive cooperating coupling members 156 in the cap 150. These features allow the cap 150 to snap into engagement with the base plate 142 for ease of manufacturing. In the example embodiment, the rail 160 comprises an inwardly extending circular flange 162 configured to be received within the circular channel between the cap 150 and the base plate 142. The flange 162 preferably forms a close or free running fit within the channel, allowing smooth rotational movement of the rail 160 and attached ring 120 relative to the base plate 142 when in use. A bushing 164 is optionally provided between the flange 162 and the cap 150 to provide smooth rotational motion and/or positional retention. The brushing can be formed from a synthetic polymer such as nylon or acetal.

Figure 12A:
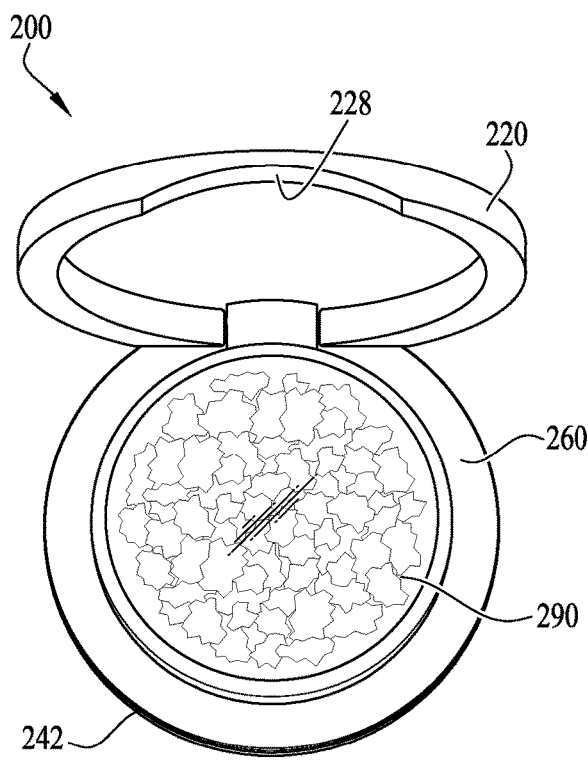
FIGS. 12A-C are top views of holder accessories for a portable electronic device according to another example embodiment of the present invention.
Figure 12B:
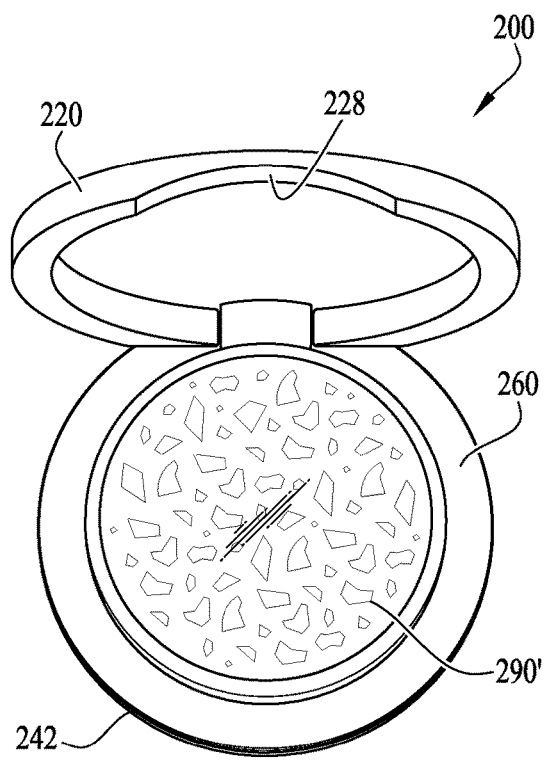
Figure 12C:
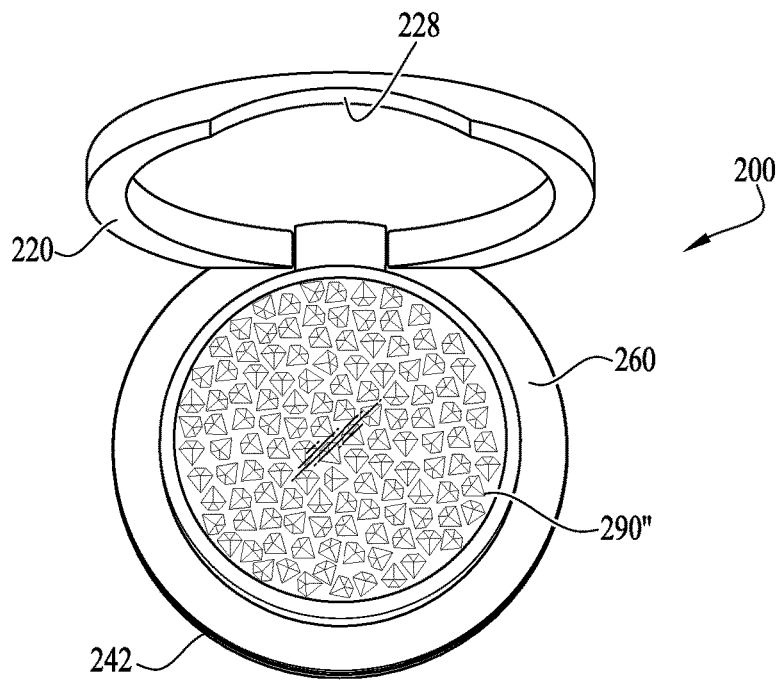
Figure 13:
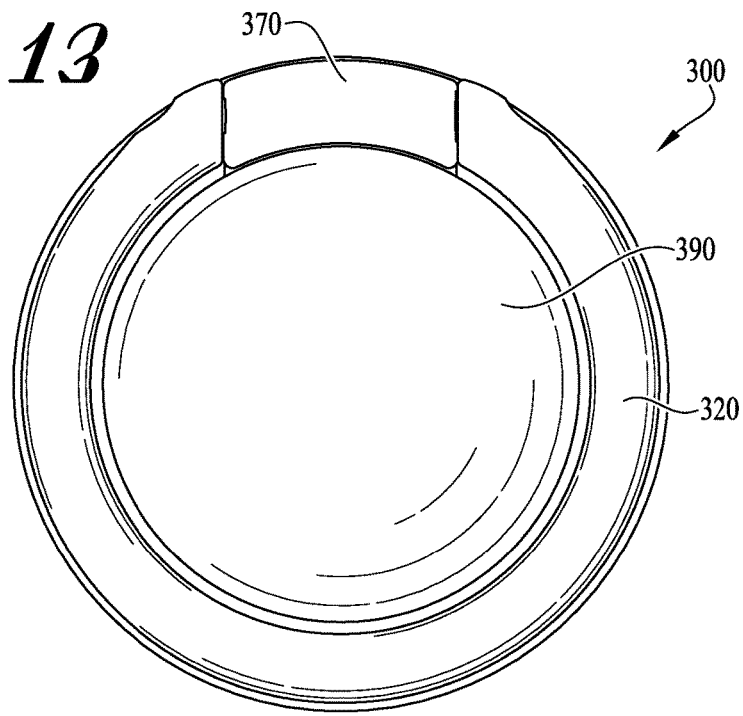
FIG. 13 is a top view of a holder accessory for a portable electronic device according to another example embodiment of the present invention.
Figure 14:
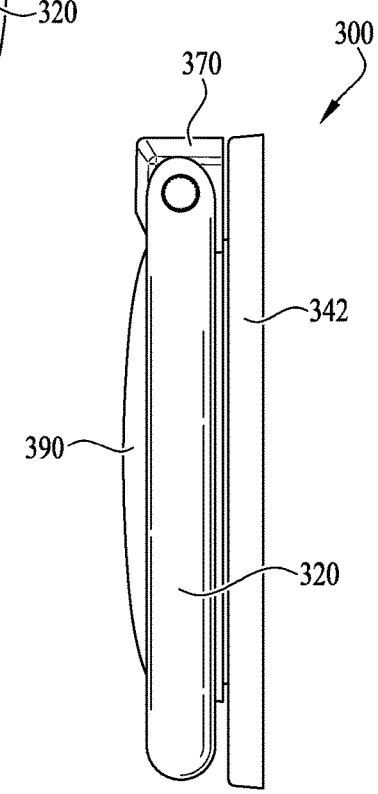
FIG. 14 is a side view of the holder accessory of FIG. 13.

FIGS. 12A-C show a holder accessory 200 according to another example embodiment of the invention. An ornamental inlay material 290 or other decorative cover portion is optionally applied over a cap portion 250, which overlies a central portion of the base plate 242, and retains the ring 220 in place on the rail 260. FIGS. 12A, 12B and 12C show alternate embodiments of the inlay material 290, 290' and 290", respectively. In example embodiments, the inlay material comprises a gold or rose gold foil, silver, iridescent material or other decorative metallic material, and/or one or more natural or simulated gemstone, mineral or crystalline elements. Optionally, the gripping ring 220 can also include a ridge or cutout 228 configured to assist a user in lifting the ring from the storage position where the ring is positioned against the base plate 242 or rail.

Figure 15:
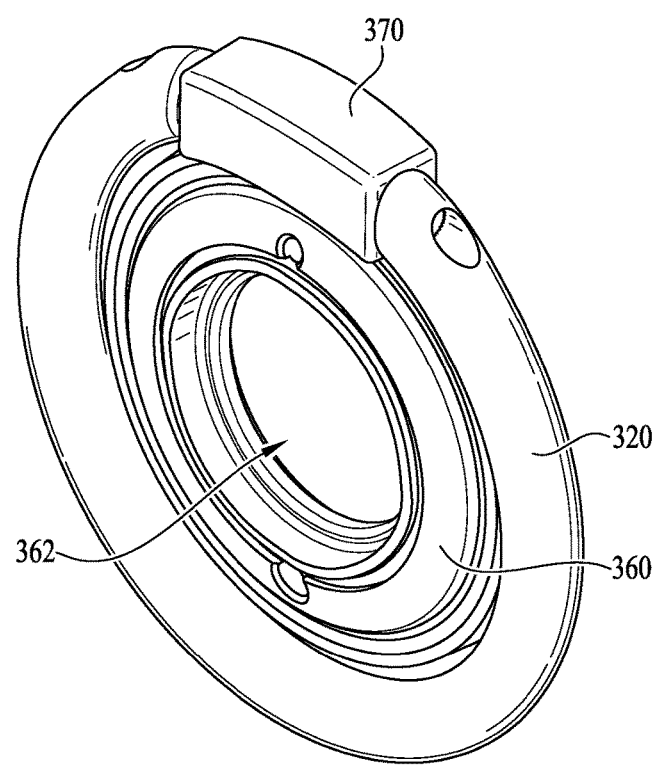
FIG. 15 is a perspective view of the gripping component and rotational or ring component of the holder accessory of FIG. 13.

FIGS. 13-20 show a holder accessory 300 for a portable device D according to another example embodiment of the invention. FIGS. 15-17 show details of the gripping ring 320 and rail 360 of the holder accessory 300. Like the previous embodiment, the gripping ring 320 is pivotally attached to a hinge 370 on the rail 360. In the depicted embodiment, the hinge mechanism 370 extends outward from the outer peripheral edge of the rail 360, rather than extending upward from the front face of the rail as in the previous embodiment. To pivotally attach the ring 320 to the hinge 370, each end of the ring includes a hole 322 configured to align with the channel 372 in the hinge. The ring 320 and hinge 370 are configured such that the ring surrounds the rail 360 when in the storage position, as shown in FIG. 15. The hinge mechanism 370 includes an insert 374 positioned within the channel 372. The insert 374 is formed from polyoxymethylene, otherwise known as acetal or POM, or another plastic material. In the example embodiment, pins 324 are inserted through the holes 322 in the ring 320 and into the insert 374 to pivotally attach the ring to the hinge 370 and the rail 360.

Figure 20:
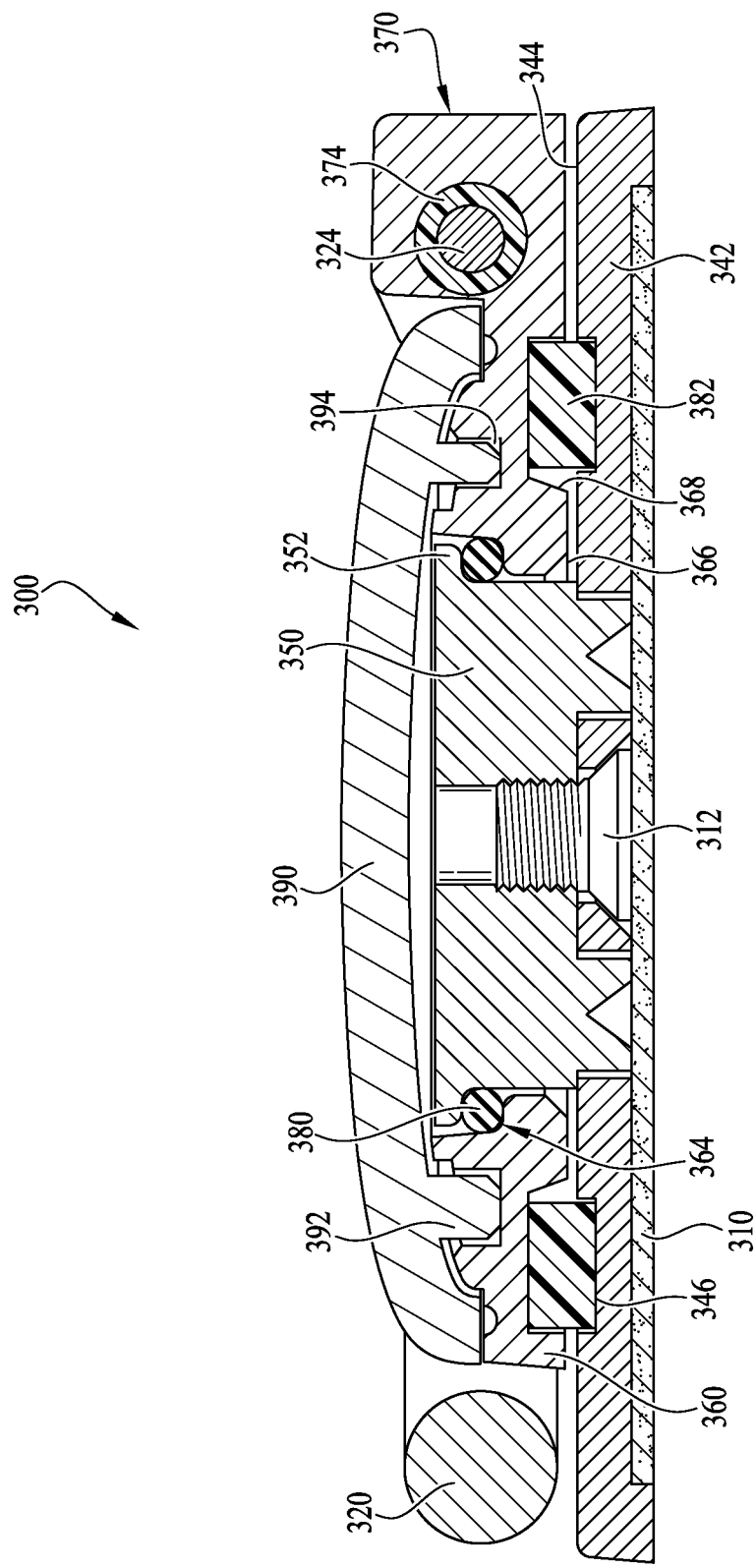
FIG. 20 is a cross-sectional view of the holder accessory of FIG. 13.

FIGS. 18-20 show additional details of the base 340 of the holder accessory 300. The base 340 includes a base plate 342 attached to a device D or device case using an adhesive 310, similar to the previous embodiments. The base 340 also includes a cap 350 attached above the base plate 342. In the depicted embodiment, the base plate 342 is attached to the cap 350 using one or more screws 312 inserted through both the base plate and the cap. Example embodiments of the holder accessory 300 also include a first seal or washer 380 positioned between the rail 360 and cap 350 and a second seal or washer 382 positioned between base plate 342 and the rail. The first seal 380 is formed from silicone or another deformable material. The first seal 380 is configured to rest along the inner perimeter surface of the rail 380. In example embodiments, the rail 360 includes a step or indention 364 along the top of the perimeter of its central aperture 362. The step 364 is configured to receive the first seal 380. In the depicted embodiment, the cap 350 includes a flange 352 along the top of its outer peripheral edge. The cap 350 is inserted through the central aperture of the rail 360 such that the first seal 380 is held between the cap flange 352 and the step 364 of the rail 360. In the depicted embodiment, the top of the cap 350 is flush or recessed within the top of the rail 360.

The second seal 382 is formed from a self-lubricating material such as Thermoplastic Polyurethane (TPU), Nylon (PA), or Acetal (POM). In example embodiments, the rail 360 includes a track 368 in its rear face 366 to accommodate the second seal 382. The base plate 342 can also include a corresponding track 346 in its front face 344. In the depicted embodiment, the second seal 382 is held between the corresponding tracks 368, 346 in the base plate 342 and rail 360. In example embodiments, the holder accessory 300 can include either the first seal 380 or the second seal 382 or can both as shown in FIG. 20. In the depicted embodiment, the rail 360 sits over the base plate 342 and is able to spin around the cap 350 inserted through its central aperture. The first and second seal 380, 382 help to provide smooth rotational motion and/or positional retention.

Optionally, the holding accessory 300 can include a decorative element or insert 390, similar to the previous embodiments. In the depicted embodiment, the insert 390 is attached to the top of the rail 360 over the cap, rather than attaching directly to the cap 350, as in the previous embodiment. In example embodiments, the insert 390 snaps into engagement with the rail 360 via one or more coupling members 392 received in cooperating slots or openings 394 in the base plate. In other embodiments, the decorative element 390 can attach to the rail 360 using another permanent or removable fastening means. In example embodiments, the decorative element 390 is removably coupled to the holder accessory 300 so that different decorative elements can be used based on the current taste of the user U.

While the invention has been described with reference to example embodiments, it will be understood by those skilled in the art that a variety of modifications, additions and deletions are within the scope of the invention, as defined by the following claims.

What is claimed is:

1. A holder accessory for a portable electronic device, comprising:
    a base portion configured for attachment to the portable electronic device, the base portion comprising a cap, a base plate, and a rail positioned between the cap and the base plate, wherein the rail is configured to rotate about a rotational axis relative to the base portion;
    a gripping component pivotally mounted to the rail, wherein the gripping component is configured to pivot about a pivot axis between a storage position and a use position, wherein the pivot axis is different than the rotational axis;
    a first seal positioned between the cap and the rail; and
    a second seal positioned between the rail and the base plate.

2. The holder accessory of claim 1, wherein the gripping component is ring shaped or includes an opening.

3. The holder accessory of claim 1, wherein the second seal is formed from a self-lubricating material.

4. The holder accessory of claim 1, further comprising an ornamental element.

5. The holder accessory of claim 4, wherein the ornamental element is attached to the cap.

6. The holder accessory of claim 1, wherein the first seal is formed from a deformable material.

7. The holder accessory of claim 1, wherein the rail comprises a hinge component comprising a tensioner component configured to bias the gripping component into at least one of the storage position and the use position.

8. The holder accessory of claim 7, wherein the at least one seal is formed from a self-lubricating material.

9. A holder accessory for a portable electronic device, the holder accessory comprising a base portion having a generally flat bottom surface configured for attachment to the portable electronic device, and a top portion coupled to the base portion, the top portion comprising a grip configured to receive a finger of a user to hold the electronic device, wherein at least one seal is provided between the base portion and the top portion and wherein the top portion is configured to rotate about a rotational axis that is orthogonal to the bottom surface of the base portion, wherein the grip is pivotally mounted to the top portion and movable between an open configuration and a closed configuration, wherein the base portion comprises a base plate and a cap, which when assembled together form a channel between them, wherein the top portion further comprises a rail which is rotationally coupled to the channel, and wherein the at least one seal is positioned between the rail and the base plate.

10. A holder accessory for a portable electronic device, the holder accessory comprising a base portion having a generally flat bottom surface configured for attachment to the portable electronic device, and a top portion coupled to the base portion, the top portion comprising a grip configured to receive a finger of a user to hold the electronic device, wherein at least one seal is provided between the base portion and the top portion and wherein the top portion is configured to rotate about a rotational axis that is orthogonal to the bottom surface of the base portion, wherein the grip is pivotally mounted to the top portion and movable between an open configuration and a closed configuration, wherein the base portion comprises a base plate and a cap which when assembled together form a channel between them, wherein the top portion further comprises a rail, which is rotationally coupled to the channel, and wherein the at least one seal is positioned between the rail and the cap.

* * * * *